(12) United States Patent
Paczkowski et al.

(10) Patent No.: US 11,836,225 B1
(45) Date of Patent: Dec. 5, 2023

(54) SYSTEM AND METHODS FOR PREVENTING UNAUTHORIZED REPLAY OF A SOFTWARE CONTAINER

(71) Applicant: T-MOBILE INNOVATIONS LLC, Overland Park, KS (US)

(72) Inventors: Lyle W. Paczkowski, Mission Hills, KS (US); William Michael Parsel, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 289 days.

(21) Appl. No.: 17/003,003

(22) Filed: Aug. 26, 2020

(51) Int. Cl.
*H04L 12/723* (2013.01)
*G06F 21/10* (2013.01)
*G06F 9/455* (2018.01)

(52) U.S. Cl.
CPC .......... *G06F 21/10* (2013.01); *G06F 9/45558* (2013.01); *G06F 2009/45587* (2013.01); *G06F 2009/45595* (2013.01)

(58) Field of Classification Search
CPC ................. G06F 21/10; G06F 9/45558; G06F 2009/45587; G06F 2009/45595
See application file for complete search history.

(56) References Cited

U.S. PATENT DOCUMENTS

| | | | |
|---|---|---|---|
| 8,380,754 B2* | 2/2013 | Laude | G09B 7/02 707/705 |
| 10,013,291 B1* | 7/2018 | Nielsen | G06F 3/0619 |
| 11,323,478 B2* | 5/2022 | Djordjevic | H04L 67/56 |
| 2014/0122435 A1* | 5/2014 | Chavda | G06F 11/1438 707/645 |
| 2015/0089577 A1* | 3/2015 | Beckman | H04L 67/56 726/1 |
| 2015/0358290 A1* | 12/2015 | Jain | H04L 63/0254 726/13 |
| 2016/0036623 A1* | 2/2016 | Clarkson | G06F 11/1456 714/4.11 |
| 2016/0255555 A1* | 9/2016 | Bergström | H04W 36/0038 713/171 |
| 2016/0342786 A1* | 11/2016 | Gerebe | G06F 21/52 |
| 2017/0017801 A1* | 1/2017 | Rosset | G06F 21/10 |
| 2017/0079059 A1* | 3/2017 | Li | H04W 16/02 |
| 2017/0164212 A1* | 6/2017 | Opsenica | G06F 16/41 |
| 2017/0206090 A1* | 7/2017 | Kirkpatrick | H04L 41/02 |

(Continued)

*Primary Examiner* — David P Zarka
*Assistant Examiner* — Wuji Chen (57) ABSTRACT

A system for preventing unauthorized replay of a software container is disclosed. The system comprises a container manager configured to receive a software container from a customer and send a software container validation request comprising a software container identity in response. The software container enables delivery of a network slice and comprises a plurality of elements. The system also comprises an anti-rollback platform that is configured to receive the validation request from the container manager, search a data store for the software container identity, compare the elements of the software container to corresponding elements stored in the data store as associated with the software container identity in response to locating the software container identity in the data store, and validate the software container based on the comparison. The container manager provides the network slice to the customer in response to the validation.

20 Claims, 7 Drawing Sheets

(56) References Cited

U.S. PATENT DOCUMENTS

| | | | |
|---|---|---|---|
| 2017/0318048 A1* | 11/2017 | Htay | H04L 63/1433 |
| 2018/0191782 A1* | 7/2018 | Djordjevic | H04L 67/289 |
| 2018/0262431 A1* | 9/2018 | Zhang | H04L 47/20 |
| 2018/0300499 A1* | 10/2018 | Agarwal | G06F 8/60 |
| 2019/0104102 A1* | 4/2019 | Khan | G06Q 20/382 |
| 2020/0012510 A1* | 1/2020 | Andrianov | G06F 9/45558 |
| 2020/0037214 A1* | 1/2020 | Jin | H04W 28/0268 |
| 2020/0092424 A1* | 3/2020 | Qiao | H04M 15/8033 |
| 2020/0214054 A1* | 7/2020 | Qiao | H04W 48/18 |
| 2020/0259765 A1* | 8/2020 | Bosshart | H04L 45/7453 |
| 2020/0267554 A1* | 8/2020 | Faccin | H04L 63/101 |
| 2020/0351650 A1* | 11/2020 | Maria | H04L 9/3239 |
| 2020/0367054 A1* | 11/2020 | Obaidi | H04L 9/0643 |
| 2020/0374698 A1* | 11/2020 | Ying | H04W 12/06 |
| 2021/0027415 A1* | 1/2021 | Khalid | H04L 67/1008 |
| 2021/0091994 A1* | 3/2021 | Meirosu | H04L 41/5006 |
| 2021/0097477 A1* | 4/2021 | Zhang | G06Q 10/08 |
| 2021/0105196 A1* | 4/2021 | Dao | H04L 43/028 |
| 2021/0136140 A1* | 5/2021 | Tidemann | H04L 47/2441 |
| 2021/0234836 A1* | 7/2021 | Li | H04L 63/0281 |
| 2021/0250223 A1* | 8/2021 | Lisle | G06F 11/1464 |
| 2021/0314811 A1* | 10/2021 | Barton | H04L 41/0895 |
| 2021/0326167 A1* | 10/2021 | Yang | G06F 9/5077 |
| 2021/0349747 A1* | 11/2021 | Albasheir | G06F 11/302 |
| 2022/0030424 A1* | 1/2022 | Maria | G06F 9/45558 |
| 2022/0103554 A1* | 3/2022 | Seetharaman | H04L 63/10 |
| 2022/0217540 A1* | 7/2022 | Choyi | H04W 12/30 |

\* cited by examiner

SYSTEM AND METHODS FOR PREVENTING UNAUTHORIZED REPLAY OF A SOFTWARE CONTAINER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A software container comprises an entire runtime environment (e.g., an application, the application's dependencies, libraries, and other binaries, configuration files needed to run the application, etc.) bundled into one package. A software container is different than a virtual machine in that the software container leverages the operating system kernel running on the host whereas a virtual machine needs a complete operating system installed in it to support the application. Compared to virtual machines, software containers use less hardware resources, they have faster startup times, they require less maintenance, and they are very portable. As such, a software container enables the application stored therein to run quickly and reliably from one computing environment to another.

SUMMARY

In an embodiment, a method for preventing unauthorized replay of a software container is disclosed. The method comprises receiving, by a container manager, a software container from a customer. The software container enables delivery of a network slice. The software container comprises a plurality of elements. The method also comprises in response to receiving the software container, sending, by the container manager, a software container validation request to an anti-rollback platform. The software container validation request comprises an identity of the software container. The method additionally comprises searching, by the anti-rollback platform, a data store associated with the anti-rollback platform for the identity of the software container, in response to locating the identity of the software container in the data store, comparing the elements of the software container to corresponding elements stored in the data store as associated with the identity of the software container, and confirming, by the anti-rollback platform, that there is an available use left based on a number of remaining allowed uses for the software container stored in the data store. The method further comprises decrementing, by the anti-rollback platform, the number of remaining allowed uses for the software container stored in the data store, validating, by the anti-rollback platform, the software container based on the comparison and based on the confirmation, and providing, by the container manager, the network slice to the customer in response to the validation.

In another embodiment, a system for preventing unauthorized replay of a software container is disclosed. The system comprises a container manager configured to receive a software container from a customer. The software container enables delivery of a network slice. The software container comprises a plurality of elements. The container manager is also configured to, in response to receiving the software container, send a software container validation request. The software container validation request comprises an identity of the software container. The system also comprises an anti-rollback platform comprising a data store. The anti-rollback platform is configured to receive the software validation request from the container manager, search the data store for the identity of the software container, and in response to locating the identity of the software container in the data store, compare the elements of the software container to corresponding elements stored in the data store as associated with the identity of the software container. The anti-rollback platform is also configured to confirm that there is an available use left based on a number of remaining allowed uses for the software container stored in the data store, decrement the number of remaining allowed uses for the software container stored in the data store, validate the software container based on the comparison and based on the confirmation, and provide a validation message to the container manager. The container manager provides the network slice to the customer in response to receiving the validation message.

In yet another embodiment, a method for preventing unauthorized replay of a software container is disclosed. The method comprises receiving, by a container manager, a software container from a customer. The software container enables delivery of a network slice. The software container comprises a plurality of elements. The method also comprises in response to receiving the software container, sending, by the container manager, a software container validation request to an anti-rollback platform. The software container validation request comprises an identity of the software container. The method additionally comprises searching, by the anti-rollback platform, a data store associated with the anti-rollback platform for the identity of the software container, and in response to locating the identity of the software container in the data store, comparing the elements of the software container to corresponding elements stored in the data store as associated with the identity of the software container. The method further comprises at least one of: determining, by the anti-rollback platform, that at least one element of the software container fails to match a corresponding element stored in the data store as associated with the identity of the software container, or determining, by the anti-rollback platform, that there are no available uses left based on a number of remaining allowed uses for the software container stored in the data store. The method also comprises denying, by the anti-rollback platform, validation of the software container in response to the at least one of determining that the at least one element of the software container fails to match the corresponding element stored in the data store or determining that there are no available uses left. Unauthorized replay of the software container is prevented.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In 5G technology, software containers are used to enable delivery of network slices to users (e.g., an enterprise user such as a corporation), and users may themselves initiate or request communication services based on a network slice by providing the software container. Currently there is no safeguard in place to prevent a rollback or an unauthorized replay of a software container. Thus, there is a risk that a software container may be captured by a fraudster and "played back" to get network services without having been authorized and lined up for paying for the services.

Thus, the pending application is directed to preventing unauthorized replay of a software container. The system disclosed herein includes an anti-rollback platform that creates a hyperledger record of each software container. The hyperledger is then used to validate a software container prior to providing a network slice based on the software container. For example, when a software container is first provided to a container manager from a customer, the anti-rollback platform stores an identifier of the software container as well as elements of the software container in a data store associated with the anti-rollback platform. There may also be a number of allowed uses for the software container stored in the data store as associated with the software container. When the software container is subsequently provided, the anti-rollback platform consults the data store in order to validate the software container. In particular, the anti-rollback platform may search the data store based on an identifier of the software container and compare the elements of the received software container to the elements stored in the data store as associated with the identifier of the software container. If the elements of the received software container match the corresponding elements in the data store and there is an available use left, the anti-rollback platform may validate the software container. Based on that validation from the anti-rollback platform, the container manager may provide the network slice to the customer. The element-to-element comparison may include comparisons of hashes.

If any of the elements of the received software container fail to match a corresponding element stored in the data store and/or there are no available uses left, the anti-rollback platform may deny validation of the software container, thereby preventing unauthorized replay. If any of the elements of the received software container fail to match a corresponding element stored in the data store, this may indicate an authorized modification to the software container, and an additional fee may be required before instantiating a network slice based on that software container. If there are no available uses left for the software container, this may indicated that the customer has exhausted their allotted number of uses, and an additional fee may need to be paid in order for more uses to be allocated for the software container. Thus, the anti-rollback platform helps prevent a user from capturing a software container and getting unpaid service through replay.

It will be appreciated that modern communication networks are more or less continuously evolving. Currently, wireless communication companies are designing and beginning to deploy 5G wireless technology. 5G is hoped to provide virtually unlimited bandwidth on demand, for example providing access on demand to as much as 10 gigabits per second (gbps) downlink data throughput. Due to the increased bandwidth associated with 5G, it is expected that new networks will serve, in addition to conventional cell phones, general internet service providers (ISPs) for laptops and desktop computers, competing with existing ISPs such as cable internet, and also will make possible new applications in internet of things (IoT) and machine to machine areas.

5G technology may be bifurcated into 5G radio technology and 5G core network technology. 5G radio technology is commonly referred to as New Radio (NR) and provides support for carrier aggregation (CA), multiple input/multiple output (MIMO) operation, and beam forming operations. 5G core network technology is based on a service based architecture paradigm. Rather than constructing the 5G core network as a series of special purpose communication nodes (e.g., an HSS node, a MME node, etc.), the 5G core network is provided as a set of services or network functions. These network functions can include, for example, an authentication server function (AUSF), an access and mobility management function (AMF), a session management function (SMF), a data storage function (DSF), a network exposure function (NEF), a service capability exposure function (SCEF), a network repository function (NRF), a policy control function (PCF), and other functions. These network functions may be referred to as virtual network functions (VNFs) in some contexts. The 5G core network can provide a network slice to a subscriber, for example an enterprise customer, that is composed of a plurality of 5G network functions that are configured to provide customized communication service for that subscriber, for example to provide communication service in accordance with communication policies defined by the customer.

Figure 1:
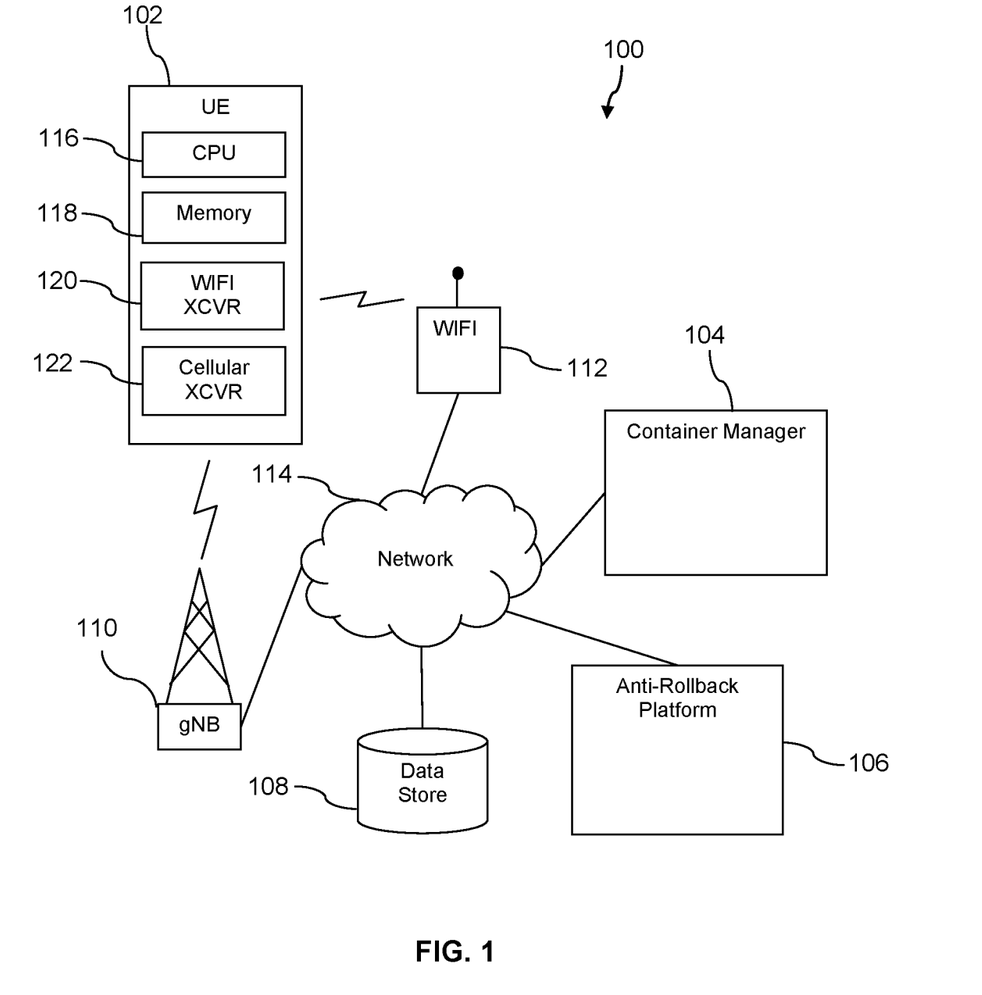
- FIG. 1 is a block diagram of a wireless communication network according to an embodiment of the disclosure.

Turning now to FIG. 1, a system 100 is described. In an embodiment, the system 100 comprises a user equipment (UE) 102, a container manager 104, an anti-rollback platform 106, a data store 108, a gNodeB (gNB) 110, a WIFI access point 112, and a network 114.

The container manager 104 may be a server computer. Server computers are discussed in more detail hereinafter. The container manager 104 may be associated with a wireless communication service provider. In an embodiment, although not illustrated in FIG. 1, the manager 104 comprises an application programming interface (API)

server, a controller manager, a scheduler, and a distributed key-value store. The container manager 104 may receive a software container from a customer. The software container may comprise a plurality of elements. The plurality of elements may include the pieces or parts that make up the software container's identity or hash. The plurality of elements may include a name of the network slice, the network upon which the network slice is residing, a gateway through which the software container flows, or other elements. The software container may also comprise a time-to-live value.

Prior to providing a network slice to the customer based on the software container, the container manager 104 may communicate with the anti-rollback platform 106 and await software container validation from the anti-rollback platform 106. For example, the container manager 104 may send the anti-rollback platform 106 a software container validation request. In an embodiment, the software container validation request comprises an identity of the software container. The identity of the software container may comprise a hash of the software container.

The anti-rollback platform 106 may be a server computer. Server computers are discussed in more detail hereinafter. In an embodiment, although not illustrated in FIG. 1, the anti-rollback platform 106 comprises an interrogator and processor. The anti-rollback platform 106 may also comprise the data store 108. In response to receiving the software container validation request from the container manager 104, the anti-rollback platform 106 may search the data store 108 for the identity of the software container. In an embodiment, the data store 108 stores a hyperledger with records of software containers that include their corresponding elements indexed by their identities.

In response to failing to locate the identity of the software container in the data store 108, the anti-rollback platform 106 may store the elements of the software container and the identity of the software container in the data store 108. The anti-rollback platform 106 may receive the elements as part of the software container validation request. Alternatively, the anti-rollback platform 106 may request and receive the elements from the container manager 104 after determining that the identity of the software container is not stored in the data store 108.

In response to locating the identity of the software container in the data store 108, the anti-rollback platform 106 may compare the elements of the software container to corresponding elements stored in the data store 108 as associated with the identity of the software container. The anti-rollback platform 106 may receive the elements as part of the software container validation request. Alternatively, the anti-rollback platform 106 may request and receive the elements from the container manager 104 after determining that the identity of the software container is stored in the data store 108.

After locating the identity of the software container in the data store 108, the anti-rollback platform 106 may compare the elements of the software container to corresponding elements stored in the data store 108 as associated with the identity of the software container. In an embodiment, the comparison comprises a comparison of hashes. For example, the anti-rollback platform 106 may compare a hash of each of the elements of the software container to a corresponding hash of each of the corresponding elements stored in the data store 108. If each of the elements of the software container match the corresponding elements stored in the data store 108, the anti-rollback platform 106 may validate the software container. In an embodiment, if one of the elements of the software container fails to match the corresponding element stored in the data store 108, the anti-rollback platform 106 does not validate the software container. If one of the elements of the software container fails to match the corresponding element stored in the data store 108, this may indicate an authorized modification to the software container, and an additional fee may be required before instantiating a network slice based on that software container.

In embodiment, in addition to comparing the elements of the software container to the corresponding elements stored in the data store 108, the anti-rollback platform 106 confirms that there is an available use left based on a number of remaining allowed uses for the software container stored in the data store 108. If there is an available use left, the anti-rollback platform 106 may decrement the number of remaining allowed uses for the software container stored in the data store 108. The anti-rollback platform 106 may validate the software container if there is an available use left and the elements of the software container and the elements of the software container match the corresponding elements stored in the data store 108. In an embodiment, if there are no available uses left, the anti-rollback platform 106 does not validate the software container. If there are no available uses left for the software container, this may indicate that the customer exhausted their allotted number of uses, and an additional fee may need to be paid in order for more uses to be allocated for the software container.

If the anti-rollback platform 106 validates the software container, the anti-rollback platform 106 may send a message to the container manager 104 indicating that the software container has been validated. If the anti-rollback platform 106 determines that the software container is not validated, the anti-rollback platform 106 may send a message to the container manager 104 indicating that the software container failed validation.

If the container manager 104 receives validation from the anti-rollback platform 106, the container manager 104 may provide or instantiate a network slice based on the software container. In an embodiment, if the container manager 104 does not receive validation from the anti-rollback platform 106, the container manager 104 does not provide or instantiate a network slice based on the software container. In this way, the anti-rollback platform 106 may help prevent unauthorized playback of a software container.

While described above as a more server focused solution to preventing unauthorized playback of a software container, in some embodiments, the solution could include some software container implemented elements. For example, the software container could include a particular code that triggers the container manager 104 to reach out to the anti-rollback platform 106 for software container validation. In another example, the software container may include the number of allowed uses such that this value may be received by the container manager 104 when the container manager 104 initially receives the software container and provided to the anti-rollback platform 106 for storage in the data store 108.

The UE 102 may be associated with the customer. If the software container is validated and the container manager 104 provides a network slice based on the software container, the UE 102 may access the network slice and obtain particular, authorized services via the network slice.

The UE 102 may comprise a processor 116 and a memory 118. The UE 102 may also comprise a WIFI transceiver 120 and a cellular transceiver 122. The UE 102 may be a mobile phone, a personal digital assistant (PDA), a media player, a wearable computer, a headset computer, a laptop computer, a tablet computer, a notebook computer, an Internet of Things (IoT) device, or any combination thereof.

The UE 102 may be configured to use the cellular transceiver 122 to establish a wireless communication link with the gNB 110 to provide access to the network 114. The cellular transceiver 122 of the UE 102 may communicate with the gNB 110 using any of a variety of wireless communication protocols including a 5G wireless communication protocol, a code division multiple access (CDMA) wireless communication protocol, a global system for mobile communication (GSM) wireless communication protocol, a long-term evolution (LTE) wireless communication protocol, or another wireless communication protocol. In some contexts, the gNB 110 may be referred to as an access node, a cell tower, or a cell site. The UE 102 may also be configured to use the WIFI transceiver 120 to establish a wireless communication link with the WIFI access point 112 to provide access to the network 114. The network 114 may comprise one or more private networks, one or more public networks, or a combination thereof. For example, the network 114 may comprise a radio access network (RAN) of a telecommunications service provider. The UE 102 may access the network 114 to obtain a variety of communication services. It is understood that any number of UEs 102, container managers 104, anti-rollback platforms 106, data stores 108, gNBs 110, and WIFI access points 112 may exist in the system 100.

Although not illustrated in FIG. 1, in some embodiments, there may be one or more additional container managers associated with other carriers who provide roaming wireless coverage to UEs (such as UE 102). These other container managers may also communicate with the anti-rollback platform 106 to determine whether a particular software container for a roaming subscriber on their network is validated before providing the network slice to the roaming subscriber.

Figure 2A:
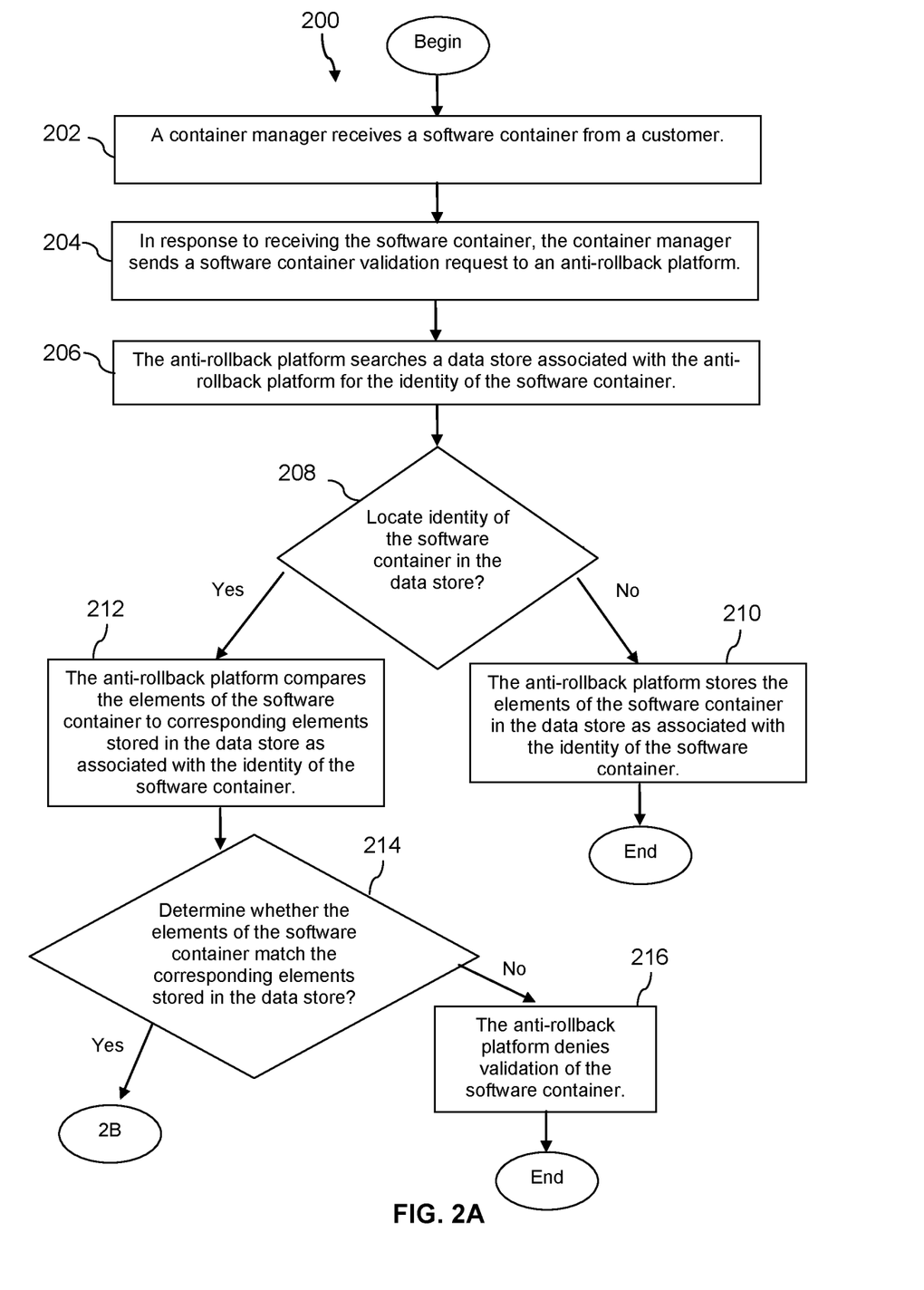
FIGS. 2A and 2B are flow charts of a method according to an embodiment of the disclosure.
Figure 2B:
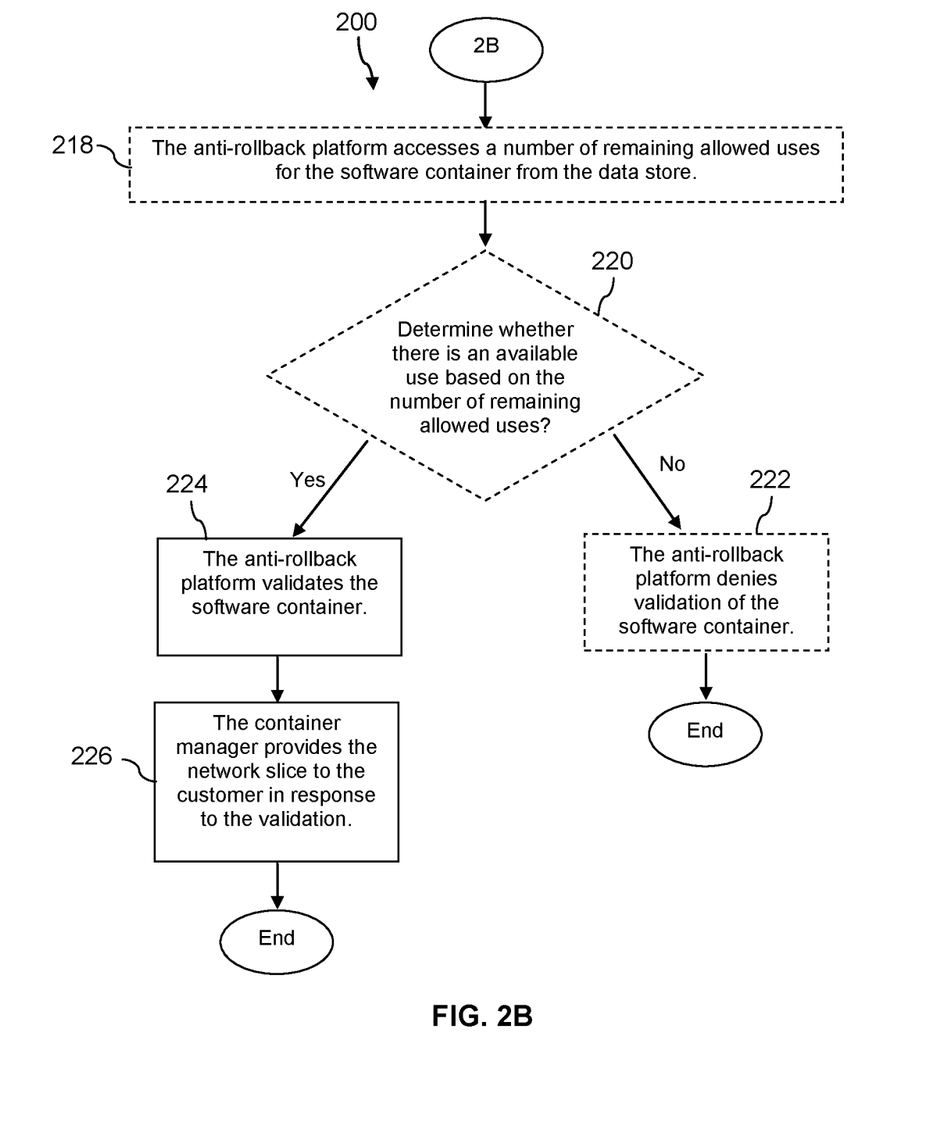

Turning now to FIGS. 2A and 2B, a method 200 is described. At block 202, a container manager (e.g., container manager 104) receives a software container from a customer. At block 204, in response to receiving the software container, the container manager sends a software validation request to an anti-rollback platform (e.g., anti-rollback platform 106). The software container validation request may comprise an identity of the software container. At block 206, the anti-rollback platform searches a data store (e.g., data store 108) associated with the anti-rollback platform for the identity of the software container.

At block 208, a determination is made regarding whether the anti-rollback platform located the identity of the software container in the data store. If the anti-rollback platform did not locate the identity of the software container in the data store, at block 210, the anti-rollback platform stores the elements of the software container in the data store as associated with the identity of the software container. Since this would presumably be the first use of the software container because its identity was not initially stored in the data store, the anti-rollback platform may validate the software container such that the container manager can send a network slice to the customer.

If the anti-rollback platform locates the identity of the software container in the data store, at block 212, the anti-rollback platform compares the elements of the software container to corresponding elements stored in the data store as associated with the identity of the software container. This comparison may be a comparison of hashes. The elements of the software container may be received by the anti-rollback platform in the container validation request or the anti-rollback platform may request the elements from the container manager in response to the anti-rollback platform locating the identity of the software container in the data store.

At block 214, a determination is made regarding whether the elements of the software container match the corresponding elements stored in the data store. If the anti-rollback platform determines that one or more of the elements of the software container fail to match the corresponding elements stored in the data store, which may indicate an authorized modification to the software container, at block 216, the anti-rollback platform denies validation of the software container. In such a case, the anti-rollback platform may send a message to the container manager denying validation of the software container. Based on the denial of validation, the container manager does not provide the network slice to the customer without further action (e.g., additional payment from the customer). In this way, the unauthorized replay of the software container may be prevented.

If the anti-rollback platform determines that each of the elements of the software container match the corresponding elements stored in the data store, the method may skip to block 224 where the anti-rollback platform validates of the software container. In such a case, the anti-rollback platform may send a message to the container manager indicating that the software container has been validated. At block 226, the container manager provides the network slice to the customer in response to the validation.

In an embodiment, after the anti-rollback platform determines that each of the elements of the software container match the corresponding elements stored in the data store, at optional block 218, the anti-rollback platform accesses a number of remaining allowed uses for the software container from the data store. At optional block 220, a determination is made regarding whether there is an available use left based on the number of remaining allowed uses. If the anti-rollback platform determines that there is no available use left, which likely indicates that the customer has exhausted all of their available uses, at optional block 222, the anti-rollback platform denies validation of the software container. In such a case, the anti-rollback platform may send a message to the container manager denying validation of the software container. Based on the denial of validation, the container manager does not provide the network slice to the customer without further action (e.g., additional payment from the customer). In this way, the unauthorized replay of the software container may be prevented.

If the anti-rollback platform determines that there is an available use left, at block 224, the anti-rollback platform validates of the software container. As discussed above, in such a case, the anti-rollback platform may send a message to the container manager indicating that the software container has been validated. At block 226, the container manager provides the network slice to the customer in response to the validation.

Figure 3:
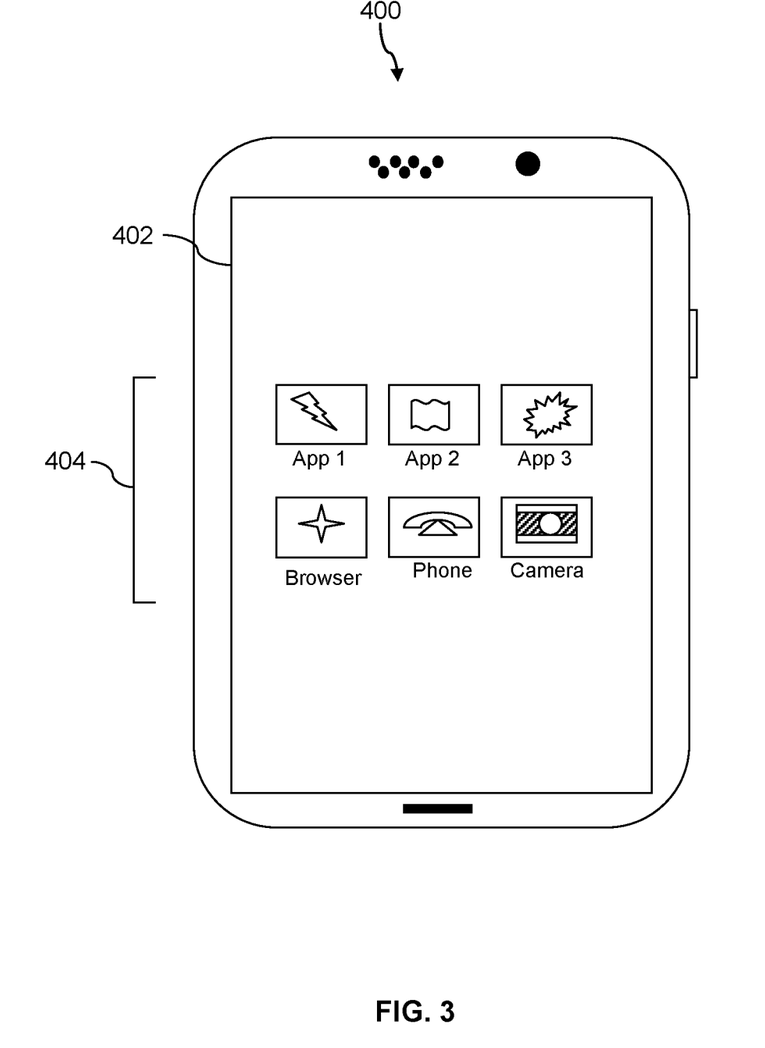
FIG. 3 is an illustration of a user equipment (UE) according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
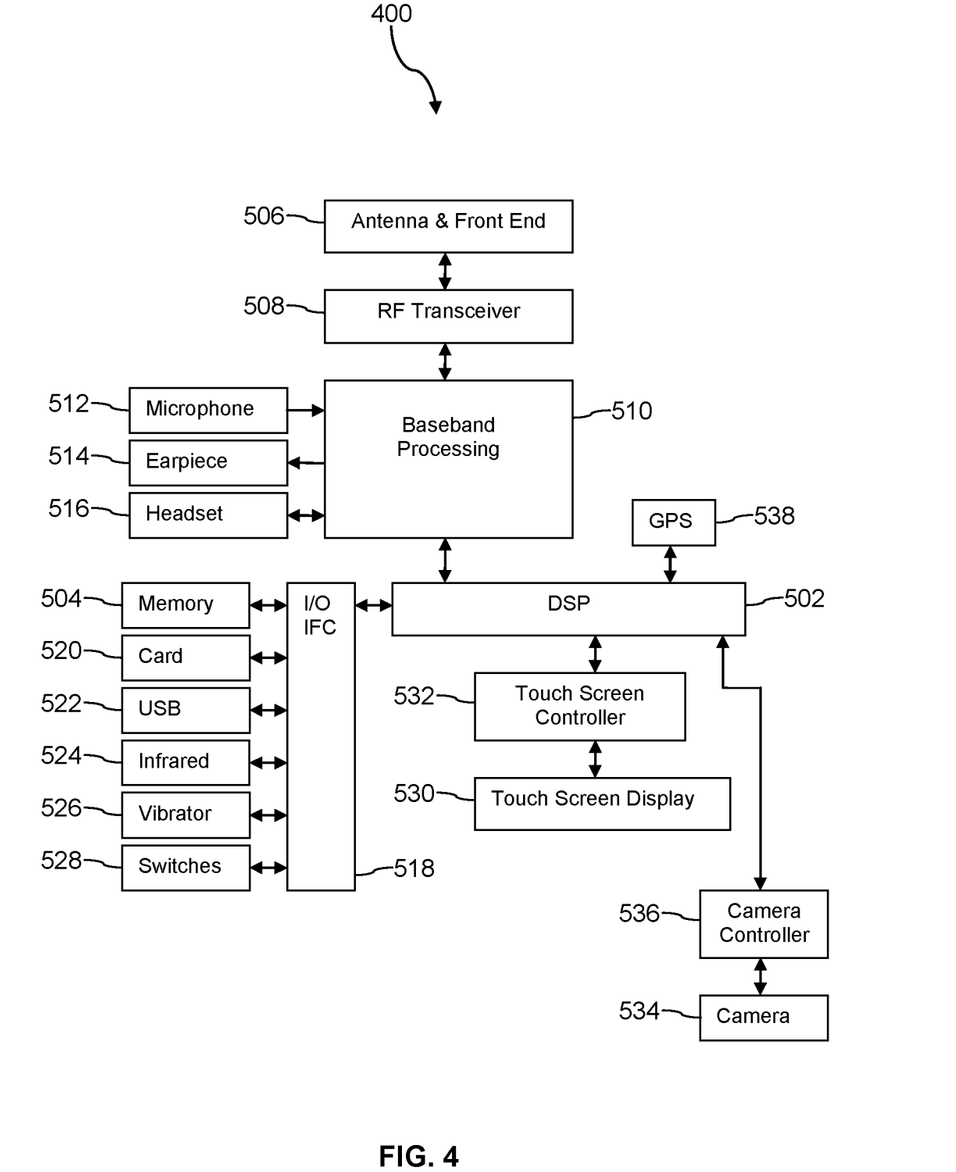
FIG. 4 is a block diagram of a hardware architecture according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
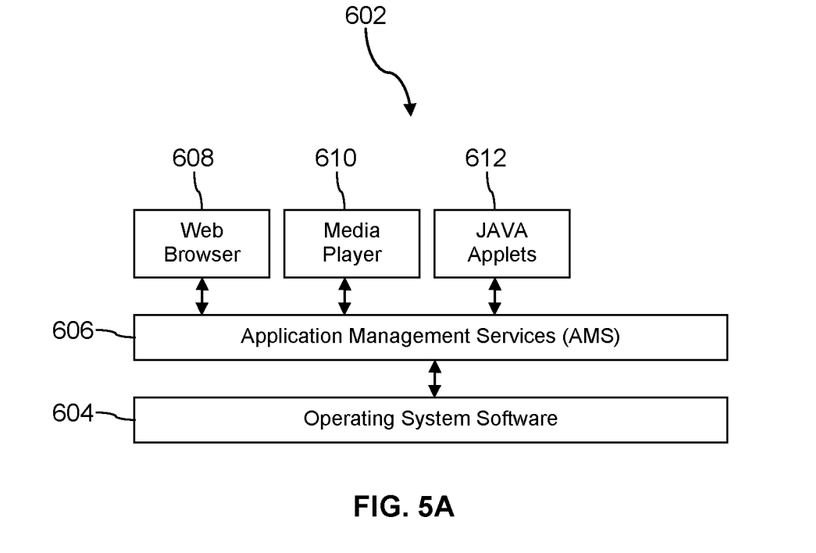
FIG. 5A is a block diagram of a software architecture according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 5A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 5B:
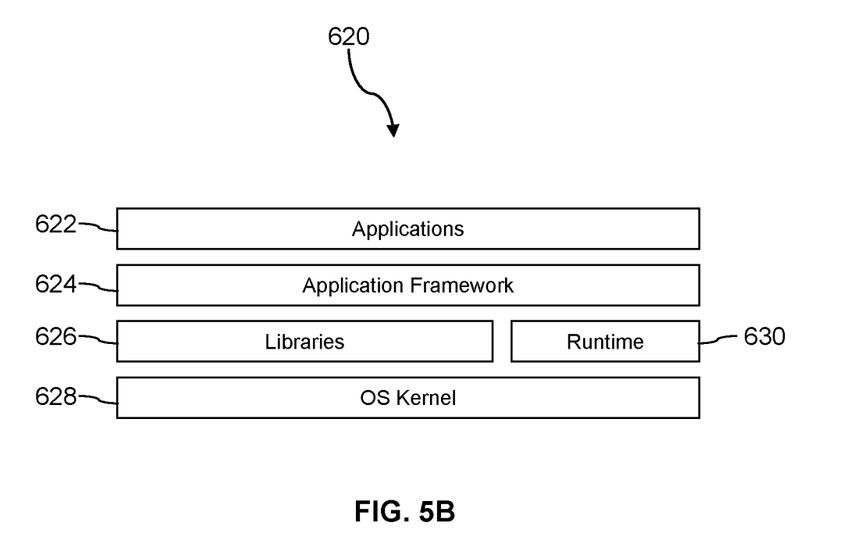
FIG. 5B is a block diagram of another software architecture according to an embodiment of the disclosure.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
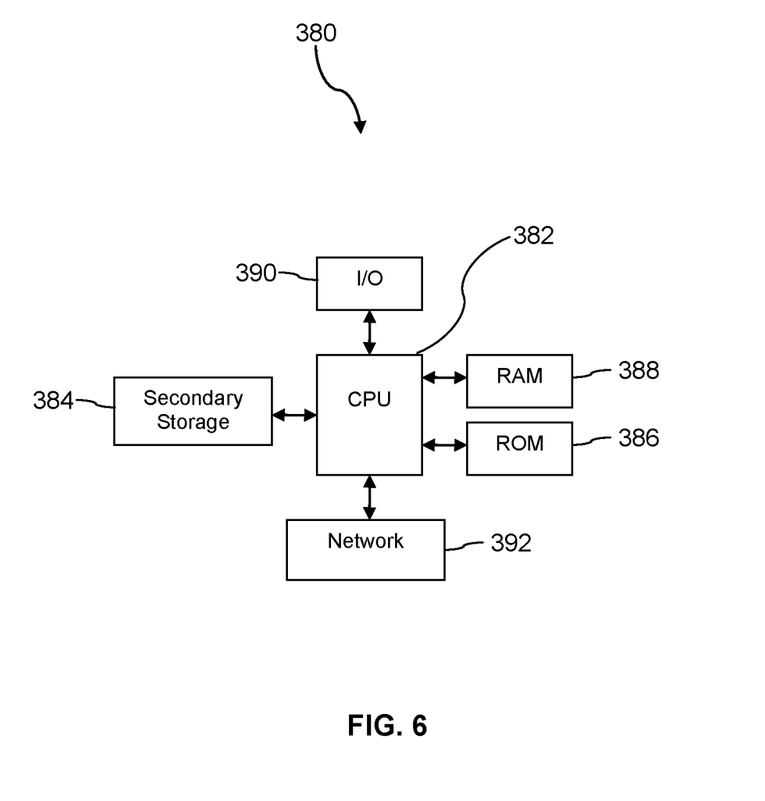
FIG. 6 is block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for preventing unauthorized replay of a software container, comprising:

receiving, by a container manager, a software container from a customer, wherein the software container enables delivery of a network slice, and wherein the software container comprises a plurality of elements;

executing executable code of the software container, wherein the executable code triggers the container manager to send a software container validation request to an anti-rollback platform, wherein the software container validation request comprises an identity of the software container;

searching, by the anti-rollback platform, a data store associated with the anti-rollback platform for the identity of the software container, wherein the searching includes searching a hyperledger including records of software containers indexed according to their identities;

in response to locating the identity of the software container in the data store, comparing the elements of the software container to corresponding elements stored in the data store as associated with the identity of the software container;

confirming, by the anti-rollback platform, that there is an available use left based on a number of remaining allowed uses for the software container stored in the data store;

decrementing, by the anti-rollback platform, the number of remaining allowed uses for the software container stored in the data store;

validating, by the anti-rollback platform, the software container based on the comparison and based on the confirmation; and providing, by the container manager, the network slice to the customer in response to the validation of the software container based on the comparison and based on the confirmation.

2. The method of claim 1, wherein the identity of the software container comprises a hash of the software container.

3. The method of claim 1, wherein the elements of the software container are received by the anti-rollback platform from the container manager as part of the software container validation request.

4. The method of claim 1, further comprising:
in response to locating the identity of the software container in the data store, requesting, by the anti-rollback platform, the elements of the software container from the container manager; and
receiving, by the anti-rollback platform, the elements of the software container from the container manager.

5. The method of claim 1, wherein comparing the elements of the software container to the corresponding elements stored in the data store as associated with the identity of the software container comprises comparing a hash of each of the elements to a corresponding hash of each of the corresponding elements, and wherein the software container is validated based on the comparison when the hash of each of the elements matches the corresponding hash of each of the corresponding elements.

6. The method of claim 1, further comprising in response to a failure to locate the identity of the software container in the data store, storing, by the anti-rollback platform, the elements of the software container in the data store as associated with the identity of the software container.

7. The method of claim 1, further comprising:
receiving, by the container manager, a second software container from a second customer, wherein the second software container enables delivery of a second network slice, and wherein the second software container comprises a plurality of elements;
in response to receiving the second software container, sending, by the container manager, a second software container validation request to the anti-rollback platform, wherein the second software container validation request comprises an identity of the second software container;
searching, by the anti-rollback platform, the data store of the anti-rollback platform for the identity of the second software container;
in response to locating the identity of the second software container in the data store, comparing the elements of the second software container to corresponding elements stored in the data store as associated with the identity of the second software container;
determining, by the anti-rollback platform, that at least one element of the second software container fails to match a corresponding element stored in the data store as associated with the identity of the second software container; and
denying, by the anti-rollback platform, validation of the second software container in response to the determining, wherein unauthorized replay of the second software container is prevented.

8. The method of claim 1, further comprising:
receiving, by the container manager, a second software container from a second customer, wherein the second software container enables delivery of a second network slice, and wherein the second software container comprises a plurality of elements;
in response to receiving the second software container, sending, by the container manager, a second software container validation request to the anti-rollback platform, wherein the second software container validation request comprises an identity of the second software container;
searching, by the anti-rollback platform, the data store of the anti-rollback platform for the identity of the second software container;
in response to locating the identity of the second software container in the data store, determining, by the anti-rollback platform, that there are no available uses left based on a number of remaining allowed uses for the second software container stored in the data store; and
denying, by the anti-rollback platform, validation of the second software container in response to the determining, wherein unauthorized replay of the second software container is prevented.

9. A system for preventing unauthorized replay of a software container, comprising:
a container manager configured to:
receive a software container from a customer, wherein the software container enables delivery of a network slice, and wherein the software container comprises a plurality of elements,
execute executable code of the software container, wherein the executable code triggers the container manager to send a software container validation request, wherein the software container validation request comprises an identity of the software container; and
an anti-rollback platform comprising a data store, the anti-rollback platform configured to:
receive the software validation request from the container manager,
search the data store for the identity of the software container, wherein the searching includes searching a hyperledger including records of software containers indexed according to their identities,
in response to locating the identity of the software container in the data store, compare the elements of the software container to corresponding elements stored in the data store as associated with the identity of the software container,
confirm that there is an available use left based on a number of remaining allowed uses for the software container stored in the data store,
decrement the number of remaining allowed uses for the software container stored in the data store,
validate the software container based on the comparison and based on the confirmation, and
provide a validation message to the container manager in response to the validation based on the comparison and based on the confirmation, wherein the container manager provides the network slice to the customer in response to receiving the validation message.

10. The system of claim 9, wherein the identity of the software container comprises a hash of the software container.

11. The system of claim 9, wherein the elements of the software container are received by the anti-rollback platform from the container manager as part of the software container validation request.

12. The system of claim 9, wherein the anti-rollback platform is further configured to:
in response to locating the identity of the software container in the data store, request the elements of the software container from the container manager, and
receive the elements of the software container from the container manager.

13. The system of claim 9, wherein comparing the elements of the software container to the corresponding elements stored in the data store as associated with the identity of the software container comprises comparing a hash of each of the elements to a corresponding hash of each of the corresponding elements, and wherein the software container is validated based on the comparison when the hash of each of the elements matches the corresponding hash of each of the corresponding elements.

14. The system of claim 9, wherein the anti-rollback platform is further configured to, in response to a failure to locate the identity of the software container in the data store, store the elements of the software container in the data store as associated with the identity of the software container.

15. A method for preventing unauthorized replay of a software container, comprising:
receiving, by a container manager, a software container from a customer, wherein the software container enables delivery of a network slice, and wherein the software container comprises a plurality of elements;
executing executable code of the software container, wherein the executable code triggers the container manager to send a software container validation request to an anti-rollback platform, wherein the software container validation request comprises an identity of the software container;
searching, by the anti-rollback platform, a data store associated with the anti-rollback platform for the identity of the software container, wherein the searching includes searching a hyperledger including records of software containers indexed according to their identities;
in response to locating the identity of the software container in the data store, comparing the elements of the software container to corresponding elements stored in the data store as associated with the identity of the software container;
determining, by the anti-rollback platform, that at least one element of the software container fails to match a corresponding element stored in the data store as associated with the identity of the software container;
denying, by the anti-rollback platform, validation of the software container in response to determining that the at least one element of the software container fails to match the corresponding element stored in the data store, wherein denying validation of the software container prevents unauthorized replay of the software container.

16. The method of claim 15, wherein the identity of the software container comprises a hash of the software container.

17. The method of claim 15, wherein the elements of the software container are received by the anti-rollback platform from the container manager as part of the software container validation request.

18. The method of claim 15, further comprising:
in response to locating the identity of the software container in the data store, requesting, by the anti-rollback platform, the elements of the software container from the container manager; and
receiving, by the anti-rollback platform, the elements of the software container from the container manager.

19. The method of claim 15, wherein comparing the elements of the software container to the corresponding elements stored in the data store as associated with the identity of the software container comprises comparing a hash of each of the elements to a corresponding hash of each of the corresponding elements, wherein the determining comprises determining that the hash of at least one element of the software container fails to match the corresponding hash of a corresponding element stored in the data store as associated with the identity of the software container, and wherein the anti-rollback platform denies validation of the software container and prevents unauthorized replay of the software container in response to determining that the hash of the at least one element of the software container failing to match the corresponding hash of the corresponding element stored in the data store.

20. The method of claim 15, further comprising in response to a failure to locate the identity of the software container in the data store, storing, by the anti-rollback platform, the elements of the software container in the data store as associated with the identity of the software container.

* * * * *